United States Patent [19]

Oti

[11] Patent Number: 5,735,336

[45] Date of Patent: Apr. 7, 1998

[54] INVESTMENT CASTING METHOD UTILIZING POLYMERIC CASTING PATTERNS

[75] Inventor: James A. Oti, Franklin, Mass.

[73] Assignee: Johnson & Johnson Professional, Inc., Raynham, Mass.

[21] Appl. No.: 514,502

[22] Filed: Aug. 11, 1995

[51] Int. Cl.⁶ .................................................. B22C 9/04
[52] U.S. Cl. .................................. 164/516; 164/34
[58] Field of Search .................. 164/516, 34, 35, 164/361

[56] References Cited

U.S. PATENT DOCUMENTS

| | | | |
|---|---|---|---|
| 4,066,116 | 1/1978 | Blazek et al. | 164/34 X |
| 4,651,799 | 3/1987 | Chandley | 164/516 X |
| 4,730,657 | 3/1988 | Carson et al. | 164/35 X |
| 4,844,144 | 7/1989 | Murphy et al. | 164/35 |
| 5,176,188 | 1/1993 | Quinn et al. | 164/516 |
| 5,391,460 | 2/1995 | Dougherty et al. | 430/269 |

FOREIGN PATENT DOCUMENTS 3-60845  3/1991  Japan.

*Primary Examiner*—J. Reed Batten, Jr.
*Attorney, Agent, or Firm*—Nutter, McClennen & Fish, LLP

[57] ABSTRACT

The investment casting process utilizes an investment assembly that includes one or more vents in each casting mold. Vents facilitate the extraction of the pattern material while preventing expansion of the pattern material to the extent that mold fracture or cracking results. The vents can be formed by incorporating within the patterns of articles to be cast one or more protrusions that cause the pattern to deviate from the size and shape of the article to be cast. After assembly of one or more patterns to a riser to form a cluster, the cluster is coated with a refractory material and the refractory material is removed from the protrusions either before the refractory dries or after the refractory dries, thus producing the vents.

22 Claims, 5 Drawing Sheets

1

INVESTMENT CASTING METHOD UTILIZING POLYMERIC CASTING PATTERNS

BACKGROUND OF THE INVENTION

The invention relates to casting methods which facilitate the use of a variety of materials, such as moldable thermoplastics and photocurable polymers, to form patterns of articles to be cast.

Various metal casting processes are well known. Investment casting (or lost wax casting) is commonly used to fabricate a variety of metal parts. This process requires several steps, the first of which is to fabricate patterns that are used to form a master mold. The master mold is then used to form cast articles.

Investment casting usually requires that several wax patterns be joined together on a wax tree to enable the simultaneous manufacture of several parts. The wax tree is a solid wax cylinder that has side walls upon which the stems of the wax patterns are adhered to form a cluster. Once all wax patterns are joined to the wax tree, the cluster is coated with one or more coats of a refractory to form an investment assembly. After drying, the assembly is heated and fired and the solid wax patterns and the wax tree are extracted, yielding a shell. Molten metal is then poured into the shell so that it flows into the cavities formerly occupied by the wax patterns and the wax tree. Upon cooling, the shell is fractured and removed, and the cast metal parts are severed from the metal tree.

Recently it has become possible to use stereolithography techniques to manufacture one or more of the patterns to use in a casting process. Stereolithography involves the application of energy, such as UV radiation, to a photocurable liquid polymer. Exposure of selected regions of the polymer to the energy causes curing and solidification of the polymer. Through these techniques, three dimensional parts can be constructed in a stepwise process.

Casting patterns can also be easily and economically manufactured by techniques such as injection molding of thermoplastic resins. Examples of suitable thermoplastic resins include polystyrene, nylons, polyolefins, and cellulosics.

Photocurable polymers and moldable thermoplastics that typically can be used to form casting patterns tend to have a higher coefficient of thermal expansion than do conventional casting waxes. Thus, one potential drawback to the use of photocurable polymers and moldable thermoplastics to form casting patterns is that the greater degree thermal expansion possessed by these polymers can cause fracture of the ceramic mold during the pattern extraction stage of the process.

Accordingly, the use of photocurable polymers and moldable thermoplastics to form casting patterns provides certain advantages, such as by enabling relatively easy and efficient manufacture of patterns. However, the use of these materials increases the potential of mold cracking due to the higher thermal expansion exhibited by such polymeric patterns. New techniques are therefore necessary to enable the use of patterns formed by photocurable polymers and other polymers, while eliminating the potential of mold cracking.

It is thus an object of the invention to provide a casting process that enables the effective use of photocurable polymers and moldable thermoplastics as casting patterns to produce cast articles. Another object of the invention is to provide a casting method that enables the use of casting materials manufactured from polymers having a higher coefficient of thermal expansion, while minimizing the potential of mold cracking. A further object is to provide casting molds that facilitate the rapid extraction of the casting patterns. These and other objects will be apparent to those of ordinary skill in the art upon reading the following disclosure.

SUMMARY OF THE INVENTION

The present invention is directed to a casting method that utilizes casting patterns formed of a photocurable polymer or a moldable thermoplastic. The casting process of the invention comprises the steps of first forming from a photocurable polymer or a moldable thermoplastic one or more solid, heat disposable patterns of an article to be cast. At least one protrusion is formed on each pattern such that the protrusion causes the pattern to deviate from the desired shape of the article to be cast. One or more patterns can then be joined to a riser to form a cluster. A ceramic shell is then built up around the cluster by applying to the cluster one or more coatings of a refractory. Upon drying of the refractory material an investment assembly is formed.

During or after the formation of the investment assembly, the refractory material is removed from the protrusions formed on the patterns to create one or more vents in the investment assembly. The patterns are then extracted from within the investment assembly by subjecting the investment assembly to an elevated temperature to yield a shell having one or more hollow cavities wherein each cavity represents a negative of the article to be cast. Each cavity has at least one vent disposed therein. Once the vents are occluded the shell is filled with a molten casting material such that the molten casting material fills the cavities within the shell to form, upon cooling, cast articles. After fracturing the shell, the cast articles are removed.

The casting method of the present invention facilitates the formation of vents within the casting mold. Preferably, at least one vent is disposed within each cavity that represents a negative image of an article to be cast. The vents enable sufficient oxygen to enter the cavities to promote rapid extraction of the casting patterns, by flash firing, without any significant expansion. The vents also provide a route of escape for any pressure which may build up within the cavities. The vents thus enable photocurable polymers and moldable thermoplastics to be used as casting patterns while eliminating the potential that the mold will fracture during the pattern extraction stage of the casting process.

DETAILED DESCRIPTION OF THE INVENTION

The invention provides a casting process that is better able to accommodate the use of casting patterns made of photocurable polymers, moldable thermoplastics, or other materials that possess relatively high thermal expansion properties. Casting patterns made of photocurable polymers and moldable thermoplastics offer many advantages, but use of these materials can present drawbacks as they can cause mold cracking during the pattern extraction step because of their relatively, high degree of thermal expansion. The invention thus provides a casting technique that enables the use of casting patterns formed of photocurable polymers or moldable thermoplastics while reducing or eliminating the potential for mold cracking during the pattern extraction step of a casting process.

The invention provides a process for casting articles, through investment casting techniques, that is well suited to the use of casting articles made of photocurable polymers, moldable thermoplastics or other such materials that tend to have higher coefficient of thermal expansion. As noted above, the use of photocurable polymers and moldable thermoplastics and other materials with greater levels of thermal expansion can result in cracking of the mold or the investment assembly during the stage of the casting process in which the patterns are extracted.

Figure 1:
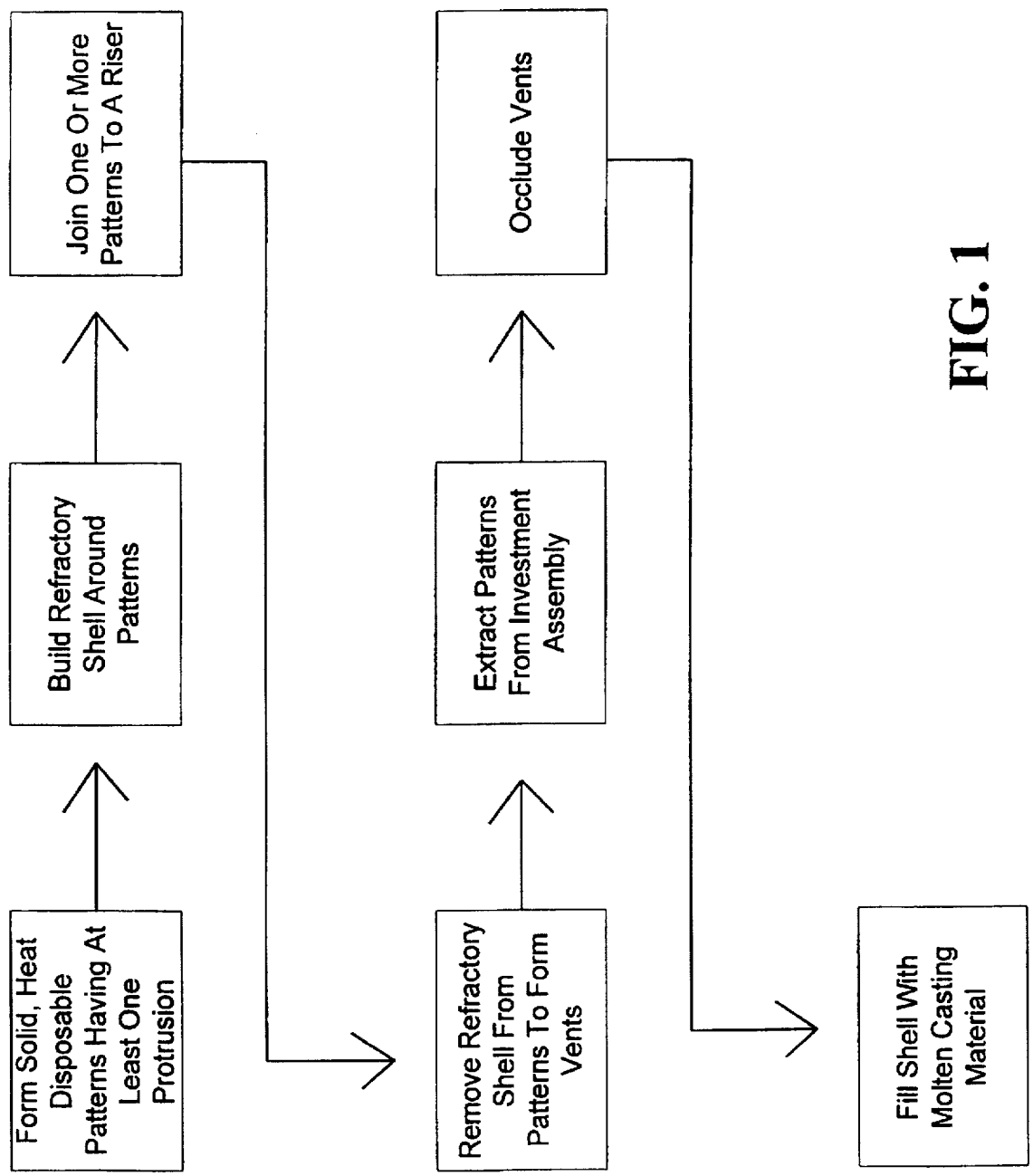
FIG. 1 is a flow chart illustrating the overall process of the present invention.
Figure 2:
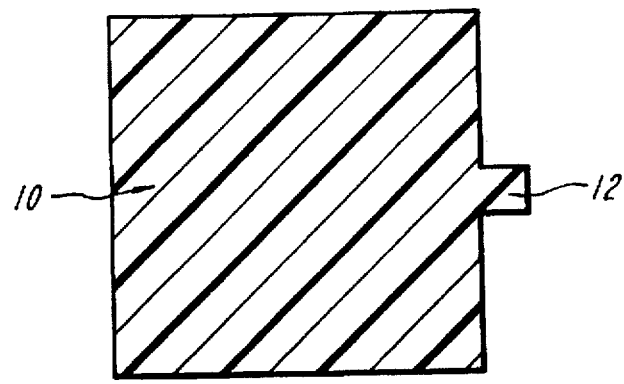
FIG. 2 is a schematic view of a casting pattern having a protrusion formed therein.
Figure 3:
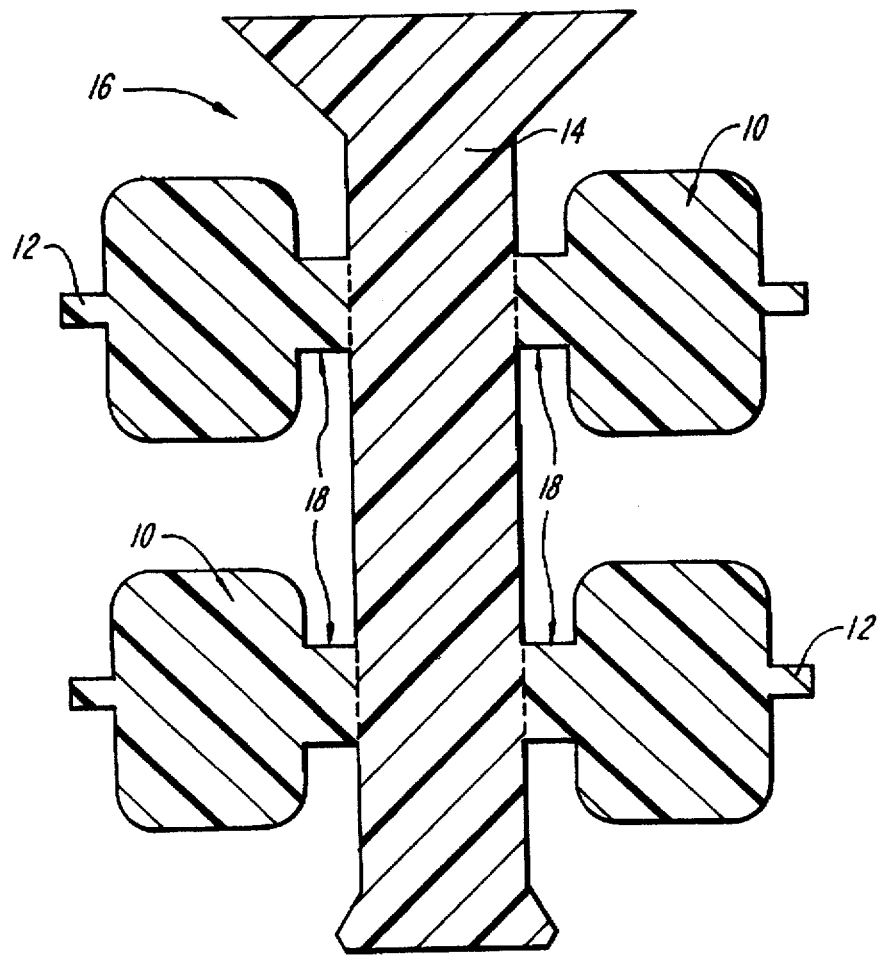
FIG. 3 is a schematic view of a cluster in which a plurality of casting patterns of the type shown in FIG. 2 are assembled to a riser system.
Figure 4:
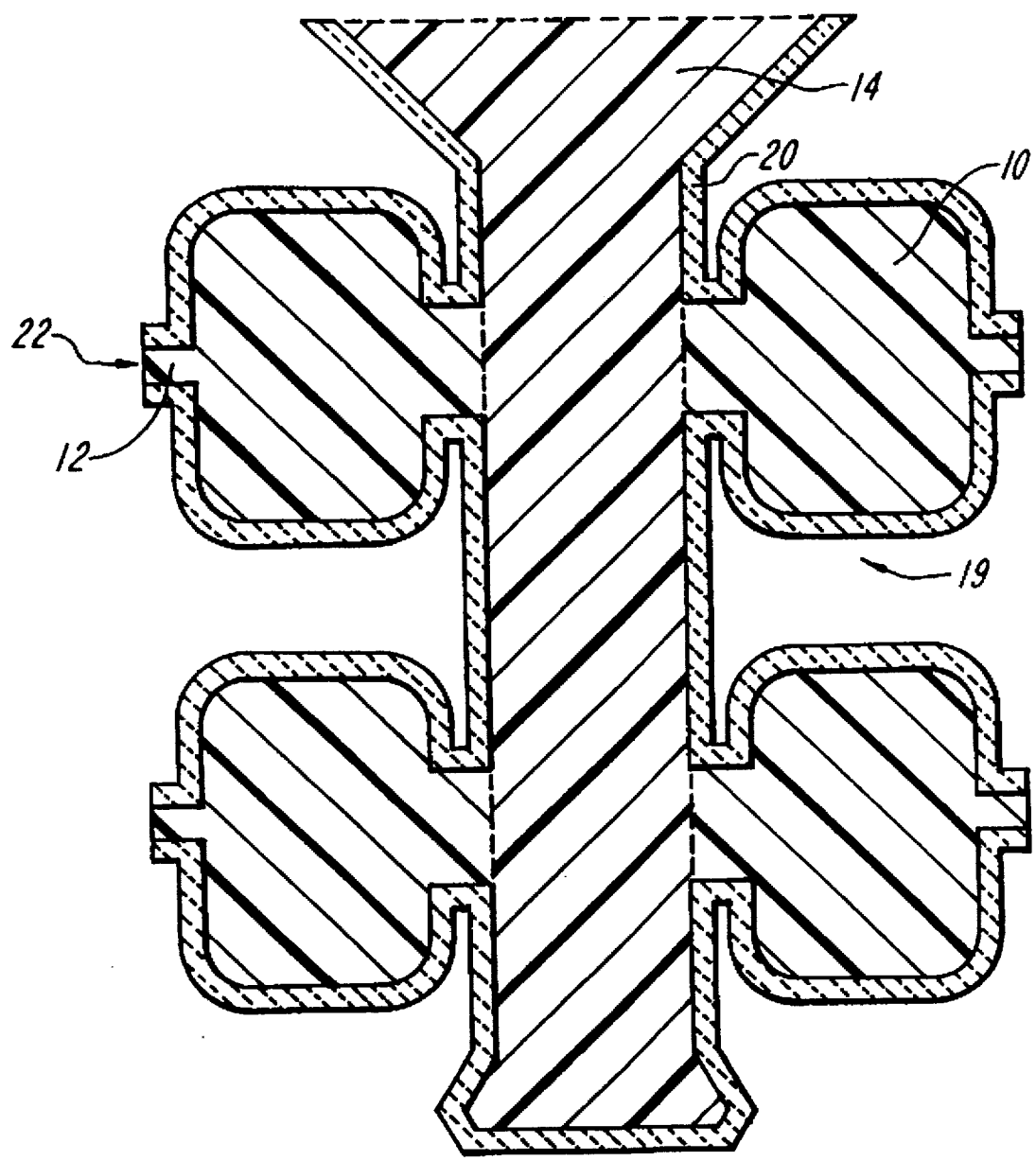
FIG. 4 is a schematic view of the cluster assembly of FIG. 3, encased in a refractory shell, forming an investment assembly in which the protrusions remain exposed.
Figure 5:
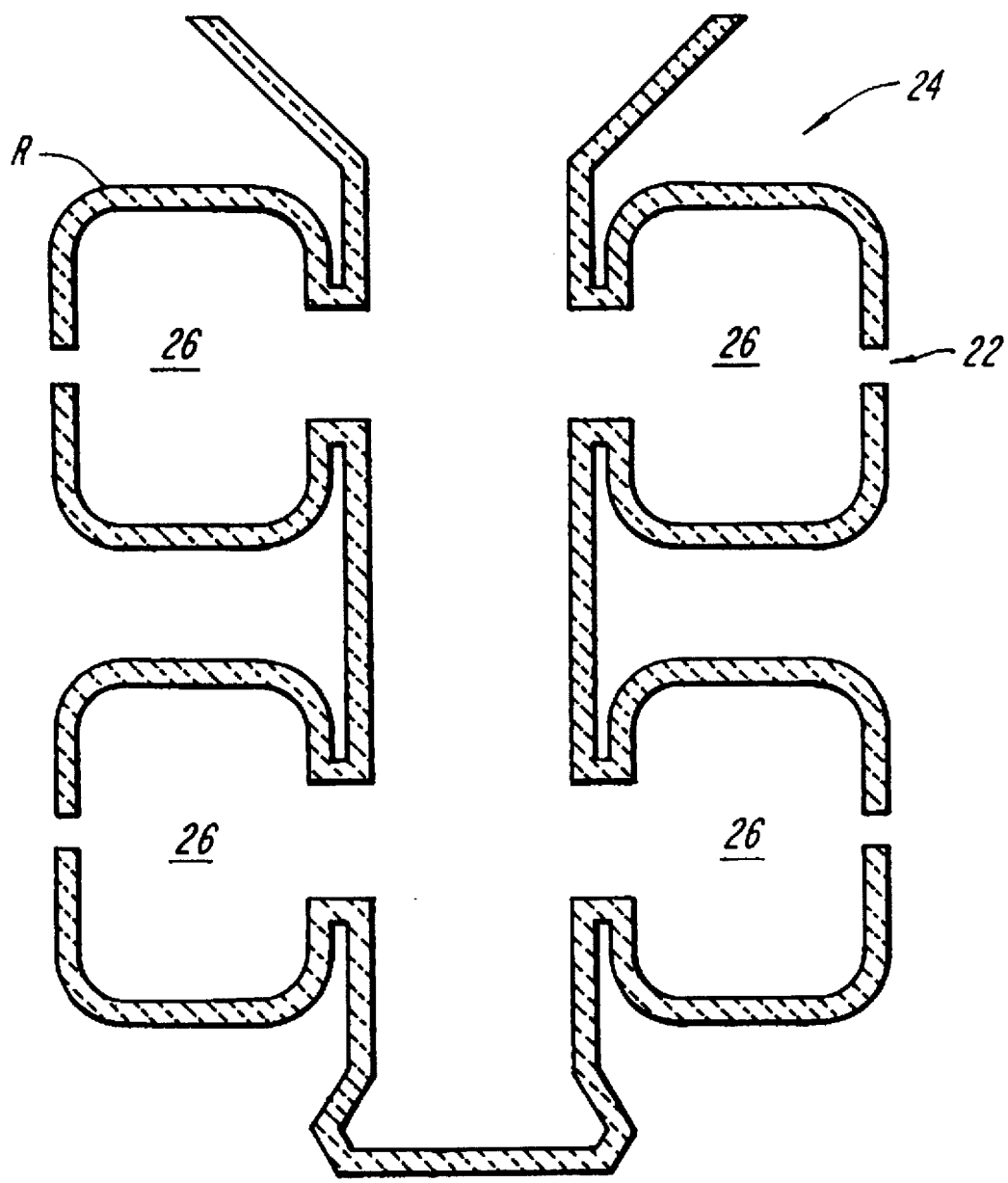
FIG. 5 is a schematic view of an investment assembly having open vents.
Figure 6:
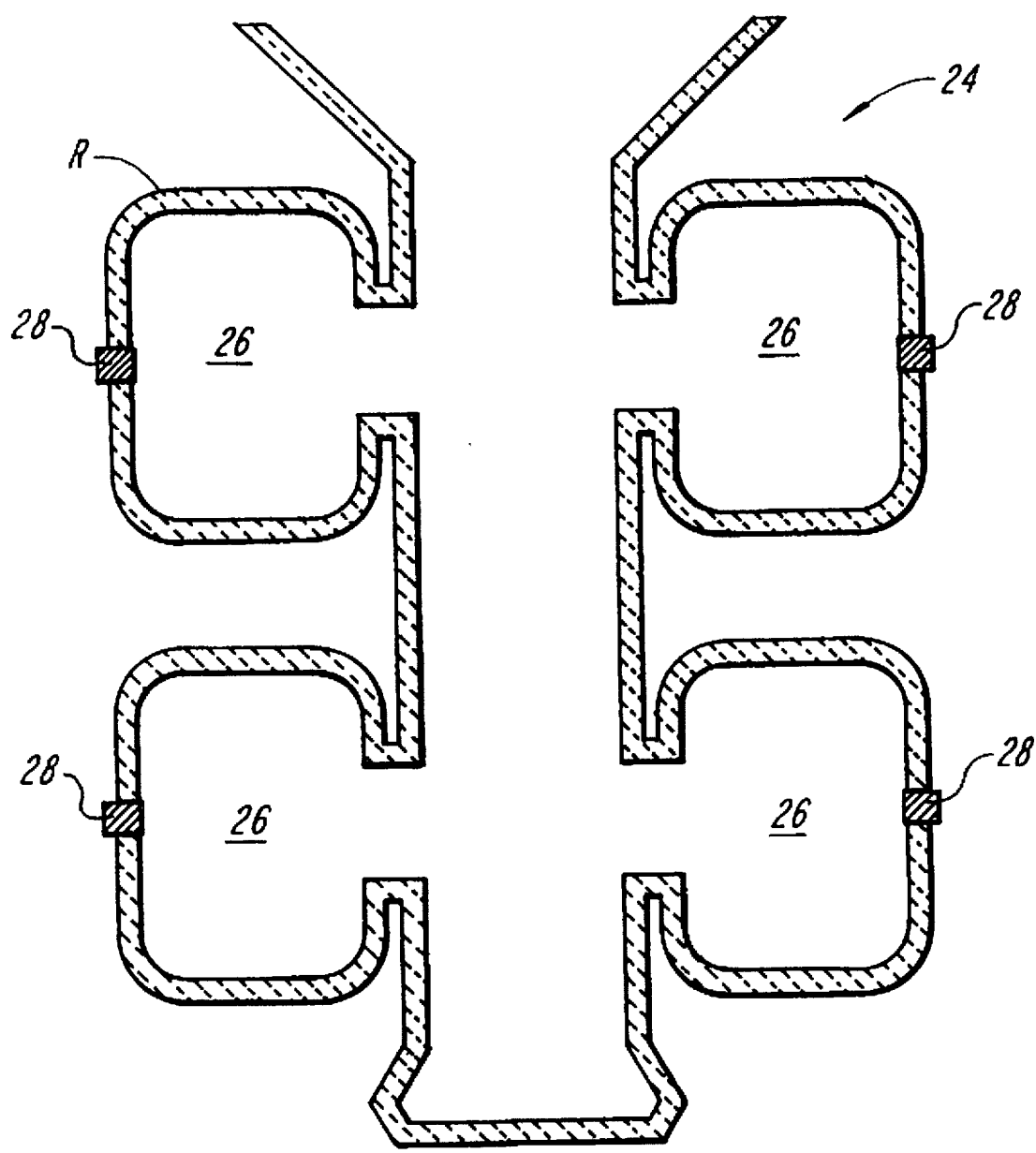
FIG. 6 is a schematic view of an investment assembly having plugged vents.

With reference to FIGS. 1–6, the process of the invention requires that one or more casting patterns 10 be fabricated in a shape that generally corresponds to the shape desired of an article to be cast. Each casting pattern includes one or more protrusions 12 that cause the pattern to deviate from the exact shape of the article to be cast. One or more such patterns 10 are then joined to a riser 14 to form a cluster 16. As is known in the art, the patterns are joined to the riser 14 by adhering gate areas 18 of the pattern to the riser 14. One or more coats of a refractory material 20 are then applied to the cluster 16 to form, after drying, an investment assembly 19.

The refractory material 20 is removed from the protrusions 12 during or after the application of the refractory material. The patterns are then extracted from within the investment assembly by conventional techniques, usually involving the application of heat and pressure, to yield a shell 24 that includes mold cavities 26. Once patterns 10 are extracted from the investment assembly 19, a ceramic shell 24 having a plurality of mold cavities 26 remains. Each cavity 26 has at least one vent 22, the location of which corresponds to the position of the protrusion in the investment assembly. Shell 24 can then be heated and fired to impart increased strength to the shell, and to remove any residual polymeric matter used to form casting patterns 10. Shell 24 preferably is fired at a temperature in the range of about 1200° F. to 2000° F. for approximately one half hour or more.

After firing, the vents 22 within the mold cavities are occluded, such as with plug 28. The shell 24 is then ready to accept molten casting material, which is poured into the mold by techniques known in the art, to form solid, cast articles. After the cast articles solidify and cool, the shell 24 can be fractured and removed by known techniques to recover the solid, cast articles.

The protrusions can be formed on the patterns by a number of techniques. In one embodiment, the protrusions may be formed integrally with the patterns during manufacture of the patterns, such as by stereolithography (in the case of a photocurable polymer) or by molding (in the case of a moldable thermoplastic). Alternatively, the protrusions can be separately manufactured and adhered to the patterns after manufacture of the patterns by techniques that are well known to those of ordinary skill in the art, such as by adhering one or more heat disposable rods to the patterns. The diameter of each protrusion formed on the pattern generally corresponds to the size and shape of a vent.

The number and size of the protrusions formed on each pattern may also vary depending upon the optimal number and size of the vents desired for a given mold cavity. Those of ordinary skill in the art will readily appreciate that the size and number of the vents required will depend upon the size and number of the parts being manufactured. Normally, it is sufficient to have one to two vents per mold cavity, however, more vents may also be used. Preferably, the size and number of vents are varied to achieve a desired ratio of the modulus of the vent component to the modulus of the mold cavity in the range of about 0.100 to 0.500. The term "modulus" as used herein, is defined as the ratio of the volume to the surface area for each component under reference. Thus, the cumulative modulus for each part, which preferably is in the range of 0.100 to 0.500, is the ratio of the vent modulus (volume to surface area ratio of vents) to the mold cavity modulus (volume to surface area ratio of total mold cavity).

The formation of vents within the mold cavity, is the culmination of a number of steps in the process. As noted, the protrusions formed on the patterns correspond to the ultimate location of vents in the mold cavity. After the patterns are joined to a riser to form a cluster, the cluster is coated with a refractory material. In one embodiment vents can be formed by removing the refractory material from the protrusion following each application of a refractory material, thus creating a discontinuity in the refractory surface of the mold cavity. This can be accomplished by a variety of techniques, including by simply wiping the protrusion clean of the refractory material after each application of refractory before the refractory material dries. Alternatively, the refractory material can be allowed to remain covering the protrusion. Once the refractory material has dried and the investment assembly is formed, the entire protrusion and its surrounding refractory material can be removed by cutting, filing or grinding techniques. Either option for removing the refractory from the part of the investment assembly corresponding to the protrusion results in a discontinuity in the surface of the refractory material of the investment assembly which forms a vent.

As is known in the art, the casting patterns are removed from the investment assembly by subjecting the investment assembly 19 to an elevated temperature that is sufficient to melt and extract the casting patterns 10. The temperature to which the investment assembly is heated to melt and extract the casting patterns 10 will depend to a large extent upon the physical properties of the polymer that is used to form the patterns. Nevertheless, this temperature is typically in the range of from about 135° F. to 2000° F. This heat extraction step is conducted using procedures well known in the art to extract the solid, heat disposable patterns during an investment casting process.

The vents that are formed in the mold during the casting process are believed to be advantageous because during the extraction process the vents allow oxygen into each mold cavity, thereby permitting the polymer to react rapidly and to soften without expanding to an extent that the mold is subject to cracking. The vents also serve to relieve the internal pressures that can build up within the mold cavities, thus preventing further cracking of the mold.

The patterns used in the process of the invention can be formed by a variety of known photocurable polymers or moldable thermoplastics. In a preferred embodiment of the invention, photocurable polymers can be used to form casting patterns through known stereolithography techniques in which a reservoir of a liquid, photocurable polymer is exposed, in selected regions, to an energy source, e.g., ultraviolet light, to cure (solidify) the polymer. Successive exposures of the polymer to the energy source in a defined pattern achieves a solid, three dimensional object of a desired shape. Casting patterns can also be manufactured using moldable thermoplastics by a variety of known procedures, including injection molding and reaction injection molding.

Among the preferred liquid, photocurable chemicals are those that possess rapid curing properties when subjected to energy sources such as ultraviolet light. Another requirement of suitable liquid, photocurable polymers is that they be somewhat adhesive so that successive layers of a pattern to be formed will adhere to one another. The viscosity of these materials should be low enough so that additional reactive photocurable polymer will flow across the surface of the partially formed object upon movement of the part being formed. Preferably, the liquid, photocurable polymer will absorb light (e.g., UV light) so that a reasonably thin layer of material is formed. The polymer should also be soluble in a suitable solvent in its liquid state while being insoluble in the same solvent in its solid state. This enables the object to be washed free of remaining liquid, photocurable polymer once the object has been formed.

Useful reactive chemicals must also be heat destructible in their solid state. Preferred materials are those that melt or destract in the range of about 135° to 600° F. or higher. This heat destructibility is essential as the objects formed through the stereolithography process are positive models of articles to be cast. During the casting process, as noted above, the models are encased in a ceramic forming binder material and once the binder solidifies, heat is applied to melt and extract the models leaving behind cavities that represent negative images of the articles to be cast.

An exemplary reactive chemical useful as a liquid, photocurable polymer to form a cast article is Potting Compound 363, a modified acrylate made by Locktite Corporation of Newington, Conn. A process useful to make a typical UV curable material is described in U.S. Pat. No. 4,100,141, which is hereby incorporated by reference. Other examples of useful liquid, photocurable polymers are blends of epoxy resin and acrylate ester such as CIBATOOL® SL5081-1, SL5131, SL5139, SL5149, SL5154, SL5170, SL5170, SL5177, SL5180, all of which are available from Ciba-Geigy Corporation, Tooling Systems, East Lansing, Mich. Other suitable photocurable polymers will be readily apparent to those of ordinary skill in the art.

A variety of moldable thermoplastics can also be used to form the casting patterns. These materials include those that melt (and/or expand) in the range of about 175° to 625° F., or higher. Examples of such materials include polystyrene, polyethylene, nylons, ethyl cellulose, and cellulose acetate. These and other moldable thermoplastics are well known to those of ordinary skill in the art and are available from a variety of manufacturers.

Suitable photocurable polymers and moldable thermoplastics should also be able to be extracted from the mold by heating and/or flash firing in the range of about 1100° F. to 2000° F. to rapidly vaporize the solid polymer.

The foregoing description of the method of manufacture and the illustrative embodiments is presented to indicate the range of constructions to which the invention applies. Variations in the materials to be used in conducting the process of the invention, temperature ranges and the like will be readily apparent to those having ordinary skill in the art. Such variations are considered to be within the scope of the invention in which patent rights are asserted, as set forth in the claims appended hereto.

The entirety of all publications and/or references noted therein are expressly incorporated herein.

What is claimed is:

1. An investment casting process, comprising the steps of:
   forming one or more solid, heat disposable patterns of an article to be cast, the patterns being formed from a polymer selected from the group consisting of a moldable thermoplastic and a photocurable polymer, the patterns each including at least one protrusion on each pattern, wherein the protrusions cause the patterns to deviate from the shape of the article to be cast;
   building a shell around the patterns by applying thereto one or more coatings of a refractory material to form, upon drying, an investment assembly;
   removing the refractory material from the protrusions formed on the patterns to create one or more vents in the investment assembly at a position corresponding to the location of a mold cavity;
   rapidly extracting the patterns from within the investment assembly through a flash firing technique by subjecting the investment assembly to an elevated temperature to yield a shell having one or more mold cavities, wherein each mold cavity represents a negative of the article to be cast and each cavity has at least one vent;
   occluding the vents present within the mold cavities; and
   filling the shell with a molten casting material such that the molten casting material fills the mold cavities within the shell to form, upon cooling, cast articles.

2. The process of claim 1 wherein the protrusions are formed on the patterns during the manufacture of the patterns.

3. The process of claim 2 wherein the patterns and the protrusions are formed by a stereolithography technique.

4. The process of claim 1 wherein the protrusions are formed by adhering one or more heat disposable rods to the patterns.

5. The process of claim 4 wherein the refractory material is removed from the protrusions by wiping the refractory material away from the rods before the refractory material dries.

6. The process of claim 1 wherein the refractory material is removed after formation of the shell by cutting or filing the areas of the shell that correspond to the protrusions.

7. The process of claim 1 wherein the patterns are extracted by heating the shell to a temperature in the range of about 135° to 2000° F.

8. The process of claim 1 further comprising the step of heating and firing the shell at a temperature and for a duration sufficient to remove any residual material from which the patterns are made, and to add fired strength to the shell.

9. The process of claim 8 wherein the step of heating and firing the shell is conducted at a temperature in the range of about 1200° F. to 2000° F. for approximately one-half hour or more.

10. The process of claim 1 further comprising the step of removing the cast articles from the shell following completing the step of filling the shell.

11. The process of claim 1 wherein the cumulative modulus of the vents to the cast article is in the range of 0.100 to 0.500.

12. An investment casting process, comprising the steps of:

> forming one or more solid, heat disposable patterns of an article to be cast, the patterns being formed from a polymer selected from the group consisting of a moldable thermoplastic and photocurable polymer, the patterns each including at least one protrusion on each pattern wherein the protrusions cause the patterns to deviate from the shape of the article to be cast;
>
> providing a riser;
>
> mounting on the riser one or more of the patterns, the patterns being mounted by adhering at least one gate on each pattern to the riser to form a cluster;
>
> building a shell around the cluster by applying one or more coatings of a refractory material to the cluster to form, upon drying, an investment assembly;
>
> removing the refractory material from the protrusions formed on the patterns to create one or more vents in the investment assembly at a position corresponding to the location of a mold cavity;
>
> rapidly extracting the patterns from within the investment assembly through a flash firing technique by subjecting the investment assembly to an elevated temperature to yield a shell having one or more mold cavities, wherein each mold cavity forms a negative of the article to be cast, and each mold cavity has at least one vent formed therein;
>
> occluding the vents present within the mold cavities; and
>
> filling the shell with a molten casting material such that the molten casting material fills the mold cavities within the shell to form, upon cooling, cast articles.

13. The process of claim 12 wherein the protrusions are formed on the patterns during the manufacture of the patterns.

14. The process of claim 12 wherein the patterns and the protrusions are formed by a stereolithography technique.

15. The process of claim 12 wherein the protrusions are formed by adhering one or more heat disposable rods to the patterns.

16. The process of claim 15 wherein the refractory material is removed from the protrusions by wiping the refractory material away from the rods before the refractory material dries.

17. The process of claim 12 wherein the refractory material is removed after formation of the shell by cutting or filing the areas of the shell that correspond to the protrusions.

18. The process of claim 12 wherein the patterns are extracted by heating the shell to a temperature in the range of about 135° to 2000° F.

19. The process of claim 12 further comprising the step of heating and firing the shell at a temperature and for a duration sufficient to remove any residual material from which the patterns are made, and to add fired strength to the shell.

20. The process of claim 19 wherein the step of heating and firing the shell is conducted at a temperature in the range of about 1200° F. to 2000° F. for approximately one-half hour or more.

21. The process of claim 12 further comprising the step of removing the cast articles from the shell following completing the step of filing the shell.

22. The process of claim 12 wherein the cumulative modulus of vents to the cast article is in the range of 0.100 to 0.500.

* * * * *